US008263535B2

(12) United States Patent
Hueffer et al.

(10) Patent No.: US 8,263,535 B2
(45) Date of Patent: Sep. 11, 2012

(54) METHOD FOR PRODUCING POLYALKENYL SUCCINIMIDE PRODUCTS, NOVEL POLYALKENYLSUCCINIMIDE PRODUCTS WITH IMPROVED PROPERTIES, INTERMEDIATE PRODUCTS

(75) Inventors: Stephan Hueffer, Ludwigshafen (DE); Peter Schwab, Bad Duerkheim (DE); Klaus Fischer, Neustadt (DE); Thomas Berg, Ludwigshafen (DE); Helmut Mach, Heidelberg (DE)

(73) Assignee: BASF Aktiengesellschaft, Ludwigshafen (DE)

(*) Notice: Subject to any disclaimer, the term of this patent is extended or adjusted under 35 U.S.C. 154(b) by 1751 days.

(21) Appl. No.: 10/477,698

(22) PCT Filed: May 14, 2002

(86) PCT No.: PCT/EP02/05295
§ 371 (c)(1),
(2), (4) Date: Nov. 14, 2003

(87) PCT Pub. No.: WO02/092645
PCT Pub. Date: Nov. 21, 2002

(65) Prior Publication Data
US 2004/0180797 A1  Sep. 16, 2004

(30) Foreign Application Priority Data
May 15, 2001 (DE) .................................. 101 23 553

(51) Int. Cl.
*C10M 133/56* (2006.01)
(52) U.S. Cl. ....................................... 508/232; 508/291
(58) Field of Classification Search .................. 508/232, 508/291
See application file for complete search history.

(56) References Cited

U.S. PATENT DOCUMENTS

| 3,888,773 | A | * | 6/1975 | Nnadi et al. .................. 508/165 |
| 4,094,802 | A | * | 6/1978 | Soula et al. .................... 508/291 |
| 4,171,273 | A | | 10/1979 | Rubin et al. |
| 5,279,626 | A | | 1/1994 | Cunningham et al. |
| 5,518,511 | A | | 5/1996 | Russell et al. |
| 5,883,196 | A | * | 3/1999 | Rath et al. ..................... 525/285 |
| 6,008,165 | A | * | 12/1999 | Shanklin et al. .............. 508/185 |
| 6,372,855 | B1 | | 4/2002 | Chino et al. |

FOREIGN PATENT DOCUMENTS

| CN | 85 1 01591 A | 3/1987 |
| CN | 1078743 A | 11/1993 |
| CN | 1117993 A | 3/1996 |
| EP | 0 264 247 | 4/1988 |
| EP | 0 271 937 | 6/1988 |
| EP | 0 441 014 | 8/1991 |
| EP | 0 587 381 | 3/1994 |
| EP | 0 657 475 | 6/1995 |
| EP | 0 658 572 | 6/1995 |
| EP | 0 839 840 | 5/1998 |
| WO | 98 42808 | 10/1998 |

OTHER PUBLICATIONS

The American Heritage Science Dictionary, 2005, Houghton Mifflin Company, p. 16.*
Wikipedia, 2007, http://en.wikipedia.org/wiki/Alcohol.*

* cited by examiner

*Primary Examiner* — Jim Goloboy
(74) *Attorney, Agent, or Firm* — Oblon, Spivak, McClelland, Maier & Neustadt, L.L.P.

(57) ABSTRACT

A process for the preparation of polyalkenylsuccinimide products, in particular polyisobutenylsuccinimide products, is proposed, in which a polyalkene is reacted with a maleic acid, maleic anhydride or a functional derivative thereof to give a polyalkenylsuccinic anhydride and the polyalkenylsuccinic anhydride is then reacted with an oligoamine or polyamine, the polyalkenylsuccinic anhydride either (a) first being reacted with an alcohol or phenol and, without isolation of the reaction product, then with the oligoamine or polyamine, or (b) the polyalkenylsuccinic anhydride being reacted with the oligoamine or polyamine in the presence of an alcohol or phenol and (c) if desired, the alcohol or the phenol then being removed.

Novel polyalkenylsuccinimide products, in particular polyisobutenylsuccinimide products, and fuel additives are also proposed.

25 Claims, No Drawings

METHOD FOR PRODUCING POLYALKENYL SUCCINIMIDE PRODUCTS, NOVEL POLYALKENYLSUCCINIMIDE PRODUCTS WITH IMPROVED PROPERTIES, INTERMEDIATE PRODUCTS

Method for producing polyalkenyl succinimide products, novel polyalkenyl succinimide products with improved properties, intermediate products and the use thereof The present invention relates to a process for the preparation of polyalkenylsuccinimide products, in particular polyisobutenylsuccinimide products, novel polyalkenylsuccinimide products, in particular polyisobutenylsuccinimide products, having improved properties, polyisobutenylsuccinic monoester intermediates and their use in the novel process for the preparation of polyisobutenylsuccinimide products, a process for the preparation of the intermediates, and the use of the polyalkenylsuccinimide products, in particular polyisobutenylsuccinimide products, as additives for fuels or lubricants.

The preparation of polyalkenylsuccinimide, for example a polyisobutenylsuccinimide, from a polyolefin, e.g. polyisobutene, and maleic anhydride with formation of a polyalkenylsuccinic anhydride, e.g. a polyisobutenylsuccinic anhydride, and subsequent imidation is described in the prior art, cf. for example EP-A-264247 or EP-A-271937. Thus, EP-A-264247 describes, on page 4, the reaction of maleic anhydride with an olefinic polymer, for example polyisobutene, by heating in an ene reaction with formation of a polyisobutenylsuccinic anhydride, which can then be reacted with a polyamine to give the corresponding polyisobutenylsuccinimide (cf. also example 1 of the publication).

EP-A-271937 describes the preparation of polyolefin-substituted succinimides, in particular of polyisobutene-substituted succinimides. Here, the polyalkene or halogenated polyalkene is reacted with maleic anhydride at from 140 to 220° C., preferably in the presence of chlorine, and the resulting product is then reacted with the polyamine.

The reactions described in the prior art are generally carried out according to the following reaction scheme, shown for polyisobutenylsuccinimide by way of example.

Reaction Scheme:
Synthesis of polyisobutenylsuccinimide (PIBSI) according to the prior art, EP-A-264247

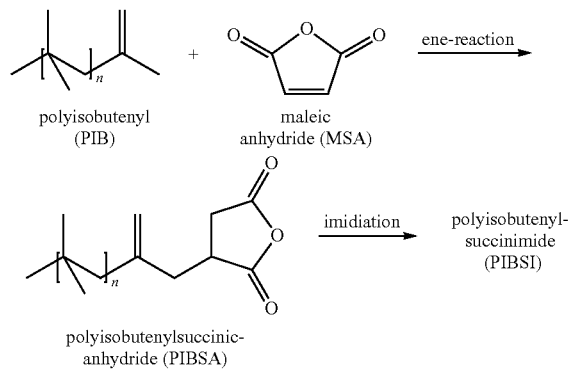

The polyalkenylsuccinimides described in the prior art are widely used, usually in combination with other additives, in fuels and lubricants, cf. for example EP-A-264247, pages 8/9, EP-A-271937 and WO 98/42808 to mention but a few examples.

Thus, WO 98/42808 describes the use of a reaction product of a polyalkenyl derivative of a monoethylenically unsaturated $C_4$-$C_{10}$-dicarboxylic acid with a polyamine as a dispersant additive for low-sulfur diesel fuels. These may be reaction products of polyisobutenylsuccinic anhydride and polyamines.

EP-A-839840 proposes succinimide compounds obtained from a succinic acid provided with an alkenyl or alkyl group as a side chain, or the corresponding anhydride, and a polyamine. These compounds are said to act as lubricant additives and counteract corrosion of diesel fuels having a high sulfur content. The side chain may be, for example, a polyisobutene. The reaction of the acid component with the polyamine takes place in a molar ratio of acid component to polyamine of 2.0 or more.

The succinimide compounds are characterized by two infrared absorption bands, an α-peak at 1640±10 cm$^{-1}$ and a β-peak at 1700±10 cm$^{-1}$, with an α-peak:β-peak intensity ratio of 0.12 or more. Since it is known, for example, that the position of the infrared absorption band and in particular the relative intensities are highly dependent on the measuring conditions, and the publication makes no mention of this, it is not possible to determine the products in this publication.

The literature also describes the preparation of polyalkenylsuccinimides, for example polyisobutylsuccinimides, and other, aftertreated additives for lubricating oils and fuels, starting from olefins and unsaturated acid components, for example maleic anhydride, or functional acid derivatives in which the radicals located at the carbonyl function may be OH, Cl or O-lower alkyl (cf. EP-A-657475). However, this publication clearly concentrates on the use of the anhydride, especially since all examples describe the use of maleic anhydride in the reaction with the polyolefin.

The same applies to EP-A-441014 and EP-A-587331, in which the examples are likewise restricted to the use of maleic anhydride.

None of the publications specifically mentions monoesters of polyisobutenylsuccinic acid.

U.S. Pat. No. 5,279,626 describes fuel additives which may contain reaction products of polyamines with hydrocarbyl-substituted succinic acid acylating agents. These include, the anhydrides, acid halides and esters (column 5). No mention is made of monoesters in the publication. However, U.S. Pat. No. 5,279,626 (cf. column 6) recommends the additional use of corrosion inhibitors, including monoesters of alkenylsuccinic acids having 8 to 24 carbon atoms in the alkenyl group with alcohols, such as polyglycols.

In the course of the present invention, it was found that, in the preparation of polyalkenylsuccinimides, in particular of polyisobutenylsuccinimide, a considerable volume increase unexpectedly occurs in the reactor during the stage in which polyalkenylsuccinic anhydride, in particular polyisobutenylsuccinic anhydride, is reacted with an oligoamine or polyamine. This is based, on the one hand, on the elimination of water or steam and, on the other hand, on an evidently large intermediate viscosity increase, which occurs when the polyalkenylsuccinic anhydride, in particular polyisobutenylsuccinic anhydride, is combined with the oligoamine or polyamine component. This volume increase is the limiting factor in determining the batch size in an existing plant. According to the Applicant's observation based on this phenomenon, the plant can as a rule be filled to only 60% of the theoretical capacity. This means that, in order to achieve specific batch sizes, production plants are required which, owing to the frothing of the mixture of starting materials, have to have a substantially larger capacity than would be required without the occurrence of the frothing phenomenon.

It is an object of the present invention to improve the known process for the preparation of a polyalkenylsuccinimide, in particular a polyisobutenylsuccinimide, by reacting a polyolefin, i.e. polyisobutene, with maleic acid, maleic anhydride or the functional derivatives thereof to give a polyalkenylsuccinic anhydride, in particular a polyisobutenylsuccinic anhydride, and then reacting the polyalkenylsuccinic anhydride, in particular polyisobutenylsuccinic anhydride, with an oligoamine or polyamine, so that the frothing of the mixture of starting materials comprising polyalkenylsuccinic anhydride, in particular polyisobutenylsuccinic anhydride, and the oligoamine or polyamine is prevented or at least greatly reduced. It is clear that the polyolefin used in the preparation of the polyalkenylsuccinanhydride has terminal double bonds, in particular double bonds of a vinylidene structure, which may undergo an ene-reaction together with the maleic acid anhydride. The amount of terminal double bonds in the polyolefin is, thus, in general at least 50 mol % and in particular at least 75 mol % (as determined with $^1$H-NMR spectroscopy and if desired in combination with $^{13}$C-NMR spectroscopy in a known manner).

We have found that this object is achieved by a process of said type, wherein a polyalkenylsuccinic anhydride, in particular a polyisobutenylsuccinic anhydride, is either
(a) first reacted with an alcohol or phenol and, without isolation of the reaction product, then with the oligoamine or polyamine, or
(b) the polyalkenylsuccinic anhydride, in particular polyisobutenylsuccinic anhydride, is reacted with the oligoamine or polyamine in the presence of an alcohol or phenol and
(c) if desired, the alcohol or the phenol is then removed.

Surprisingly, there is no frothing of the mixture of the starting materials in the novel process, so that, for the same batch, it is possible to manage with reactor volumes which are substantially smaller than those required to date. According to the novel process, the degree of filling of a plant can be increased to 85% or more of the maximum capacity, depending on the chosen reaction temperature. This improves the cost-efficiency of the process in the long term.

The novel process is further explained below with reference to the preferred embodiment using a polyisobutenylsuccinic anhydride, as an example for a polyalkenylsuccinimide. The data given for polyisobutenylsuccinanhydride correspond to other polyalkenylsuccinanhydrides.

The novel process comprises two variants: either the resulting polyisobutenylsuccinic anhydride is first reacted with the alcohol or phenol and the reaction product, without isolation, i.e. in situ or immediately, is then reacted with the oligoamine or polyamine. This can be effected in such a way that the polyisobutenylsuccinic anhydride is brought into contact with the alcohol or phenol, the reaction is allowed to take place and the oligoamine or polyamine is then introduced into the reaction space. Isolation of the monoester formed as an intermediate is not necessary. Alternatively, the polyisobutenylsuccinic anhydride can be reacted with the oligoamine or polyamine in the presence of the alcohol or phenol.

After the reaction, the alcohol or the phenol can, if desired, be removed in a conventional manner. However, this is not essential and can also advantageously be dispensed with.

The reaction of the polyisobutenylsuccinic anhydride with the alcohol or phenol is expediently effected at elevated temperatures, preferably at from 50 to 180° C., in particular from 80 to 160° C.

The novel process not only surprisingly solves the problem of frothing of the mixture of starting materials. The resulting polyalkenylsuccinimide products also differ in their properties from the polyalkenylsuccinimides of the prior art. The relatively large amount of corresponding amides always obtained in the known prior art processes is substantially reduced. In addition, the novel polyalkenylsuccinimide products contain no ester fractions, although the reaction with the alcohol or phenol was carried out in an intermediate stage.

The polyalkenylsuccinimide products and in particular the novel polyisobutenylsuccinimides obtained according to the invention, not only have a different composition to the polyisobutenylsuccinimides of the prior art but also surprisingly have superior properties compared with the known products. For example, the dispersant effect is substantially improved. When they are used in fuel, this is evident from a lower degree of coking of the injection/burner nozzles. The substantial improvement in the dispersant effect is also found when the novel polyalkenylsuccinimide products, in particular the polyisobutenylsuccinimide products, are used as additives for lubricants. Furthermore, the novel polyalkenylsuccinimide products, in particular the polyisobutenylsuccinimide products, are particularly effective for protection from corrosion and wear.

Accordingly, the present invention furthermore relates to the provision of novel polyalkenylsuccinimide products, in particular the polyisobutenylsuccinimide products, having superior properties.

The novel polyalkenylsuccinimide products, in particular the polyisobutenylsuccinimide products, are obtainable by a process in which a polyolefin, particularly a polyisobutene having terminal double bonds, is reacted with maleic acid, maleic anhydride or a functional derivative thereof to give a polyalkenylsuccinic anhydride, and the polyalkenylsuccinic anhydride or a functional derivative thereof is then reacted with an oligoamine or polyamine, polyalkenylsuccinic anhydride or its functional derivative either
(a) first being reacted with an alcohol or phenol and then, without isolation of the reaction product, with the oligoamine or polyamine, or
(b) the polyalkenylsuccinic anhydride or its functional derivative is reacted with the oligoamine or polyamine in the presence of an alcohol or phenol and
(c) if desired, the alcohol or the phenol is then removed.

The novel polyalkenylsuccinimide products obtained from a polyalkenylsuccinic anhydride or a functional derivative thereof and an oligoamine or polyamine contain not more than 30% by weight, based on the total weight of the product mixture, of the corresponding polyalkenylsuccinamide or polyalkenylsuccinic acid monoamide. Preferably, the amount of the corresponding polyalkenylsuccinamide or monoamide is not more than 25% by weight, based on the total weight of the product.

The quantitative determination of the amount of polyalkenylsuccinamide or polyalkenylsuccinic acid monoamide or polyalkenylsuccinimide in the novel product is carried out by the IR method explained below:

A quantitative determination of imide and amide substituents in the novel polyalkenyl derivative can be effected, for example, on the basis of the IR bands. With the chosen apparatus and under the chosen experimental conditions, these are at 1703 cm$^{-1}$ (imide) and 1666 cm$^{-1}$ (amide), and the reference band for polyisobutylene is at 1367 cm$^{-1}$.

The spectrometer used was a Nicolet Magna 550 (measuring parameter: resolution 4 cm$^{-1}$). The sample was applied as a thin film on a KBr window for the measurement.
Evaluation:

The determination of the extinction (band height) at the abovementioned wave numbers is carried out with the aid of a baseline with reference points 1807 cm$^{-1}$ and 1045 cm$^{-1}$.

By calculating the quotient extinction (1666 cm$^{-1}$)/extinction (1703 cm$^{-1}$), it is possible to specify only a relative amide/imide ratio since the amide and imide bands at the same concentration do not have the same intensity (different oscillator strength or excitation probability of imide and amide vibration).

On the basis of two samples having different imide/amide ratios, it is possible, by spectral subtraction, to obtain spectra which contain either-only the imide or the amide band plus the isobutylene groups associated with the substituent. The 2nd spectrum is weighted in such a way that the band of the respective other substituent is compensated (zero line). This gives an artificial polyisobutylene (PIB)-amide or PIB-imide spectrum. Any free unsubstituted PIB fractions contained in the sample result in additional absorptions at the PIB reference band at 1367 cm$^{-1}$ in these artificial spectra. If, for example, the imide spectrum thus obtained (plus said free PIB groups) is subtracted from an "original" sample spectrum, this only contains the vibration band which belong to the amide-substituted PIB. In order to obtain the spectral component of the imide-substituted PIB, the artificial PIB-amide spectrum must accordingly be subtracted from the sample spectrum.

In the spectral components thus obtained for the imide- or amide-substituted PIB, the ratios $R1$=extinction (amide band)/extinction (polyisobutylene)

and $R2$=extinction (imide band)/extinction (polyisobutylene)

can now be determined by evaluating the band. As a result of the synthesis, both the amide-substituted and imide-substituted PIB have the same chain length (20 isobutylene units) so that, on standardization of the amide-substituted and imide-substituted PIB spectra to the 1367 cm$^{-1}$ band, the extinction ratio E(1703 cm$^{-1}$)/E(1666 cm$^{-1}$) gives the factor by which the imide group is more intense than the amide group when detected by IR spectroscopy. The same is obtained computationally if R2 is divided by R1.

On the basis of representative samples, this (detection) factor was determined as F(I/A)=1.23. This value means that, at the same concentration, the imide band is about 23% higher than the amide band. If the relative amide/imide ratio mentioned at the outset is multiplied by this factor, the absolute ratio of these two functional groups in the sample to be analyzed is obtained:

Amide/imide ratio=$R$=1.23*extinction (1666 cm$^{-1}$)/extinction (1703 cm$^{-1}$)    (1)

From the amide/imide ratio R=A/I according to formula (I), it is now possible to calculate the respective amide and imide content:

The following is true $A+I=1$    (2)

From (1) and (2)$\Rightarrow A+A/R=1$ $\Leftrightarrow A(1+1/V)=1$ amide content $A=R/(1+R)$    (3)

and imide content $I=R/(1+R)$    (4)

TABLE I

Determination of the amide secondary component

| | Alcohol | Ratio of PIBSA[1)]/ROH | Amine | Ratio of PIBSA/amine | Amide content* [%] |
|---|---|---|---|---|---|
| Batch 1 | — | — | TETA[2)] | 1.0 | 40.4 |
| Batch 2 | — | — | TEPA[3)] | 1.0 | 37.2 |
| Batch 3 | n-Butanol | 0.5 | TEPA | 1.0 | 27.3 |
| Batch 4 | 2-Ethylhexanol | 1 | TEPA | 1.0 | 21.0 |
| Batch 5 | Isopropanol | 1 | TETA | 1.0 | 24.1 |
| Batch 6 | 2-Ethylhexanol | 0.5 | TETA | 1.0 | 16.8 |

*According to above IR spectroscopic method
[1)]PIBSA = Polyisobutyleneamine
[2)]TETA = Tetraethylenepentamine
[3)]TEPA = Triethylenepentamine Particularly preferred novel polyisobutenylsuccinimide products are those obtained from
(i) polyisobutene having a number average molecular weight $M_n$ of from 500 to 10000 Dalton and a content of terminal double bonds of more than 50, preferably more than 75, mol %
(ii) maleic anhydride and
(iii) a linear, branched, cyclic or cyclic branched alkylenepolyamine having 1 to 10 carbon atoms in each alkylene group and 2 to 12 nitrogen atoms, of which at least one nitrogen atom is present as a primary amino group, or mixtures thereof,
containing not more than 30% by weight, based on the total weight of the product, of the corresponding polyisobutenylsuccinamide.

Very particularly preferred novel polyisobutenylsuccinimide products are those obtained from
(i) polyisobutene having a number average molecular weight $M_n$ of from 500 to 10000 Dalton and a content of terminal double bonds of more than 50, preferably more than 75, mol %,
(ii) maleic anhydride and
(iii) an oligoamine or polyamine of the formula I:

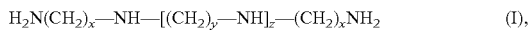

$$H_2N(CH_2)_x-NH-[(CH_2)_y-NH]_z-(CH_2)_xNH_2 \qquad (I),$$

where $_x$ and $_y$, independently of one another, are each an integer from 1 to 5, preferably from 2 to 4, and $_z$ is an integer from 0 to 8.

The present invention also relates to novel polyisobutenylsuccinic acid monoester intermediates obtained from
(i) polyisobutene having a number average molecular weight $M_n$ of from 500 to 10000 Dalton and a content of terminal double bonds of more than 50, preferably more than 75, mol %,
(ii) maleic anhydride and
(iii) alcohols of the formula ROH, where R is straight-chain or branched, cyclic or branched cyclic alkyl of 1 to 16 carbon atoms, or phenols.

The novel polyisobutenylsuccinic acid monoester intermediates occur in the novel process for the preparation of polyisobutenylsuccinimide products and can, if desired, also be isolated. They are not only useful intermediates but, alone or in combination with other additives, can also be used as additives for fuels or lubricants.

The present invention furthermore relates to a process for the preparation of polyisobutenylsuccinic acid monoester intermediates, in which a polyisobutene having terminal double bonds or whose content of terminal double bonds is at least 50 mol %, particularly at least 75 mol %, is reacted with the maleic acid, maleic anhydride or a functional derivative thereof, wherein the resulting polyisobutenylsuccinic anhydride is reacted with the alcohol.

The present invention also relates to the use of the polyisobutenylsuccinic acid monoester intermediates in the novel process for the preparation of polyisobutenylsuccinimide products.

Finally, the present invention relates to the use of the novel polyisobutenylsuccinimide products as additives for fuels, in particular diesel fuels, kerosine or middle distillates generally, heating oil and gasoline fuel, or lubricants.

According to the invention, diesel fuel additive mixtures, gasoline fuel additives and lubricant compositions are also provided, each of which contains an effective amount of novel polyisobutenylsuccinimide products.

The novel process is explained in more detail below.

For the preparation of the polyolefin-succinic anhydride, in particular polyisobutenylsuccinic anhydride (PIBSA), in the first stage, it is expedient to start from a polyolefin (polyalkene), for example polyisobutene, and a monounsaturated acid, the corresponding anhydride or ester, preferably maleic anhydride. In an ene reaction, the polyolefin undergoes an addition at the double bond of the acid component.

A particularly suitable polyolefin is polyisobutene (PIB). Polyisobutenes are described in the prior art. For example, DE-A-4319672 describes a process for the preparation of polyisobutenylsuccinic anhydride for polyisobutene and maleic anhydride, in which polyisobutene containing at least 50% of terminal double bonds is reacted with excess maleic anhydride at from 140 to 200° C.

In principle, polyisobutenes having a very broad number average molecular weight $M_n$ of from 350 to 20000 Dalton can be used in the novel process.

Polyolefins, in particular polyisobutenes, having a number average molecular weight range ($M_n$) of from 500 to 10000, preferably from 500 to 5000, are particularly preferred. Polyisobutenes of this molecular weight range are prepared, for example, according to U.S. Pat. No. 5,137,980, EP-A-145235 or U.S. Pat. No. 5,068,490. Oligopropenes or polypropenes can preferably be obtained via metallocene catalysis and are described, for example, in EP-A-490454. Oligoolefins and polyolefins of the butenes, pentenes, hexenes and decenes and copolymers of olefin mixtures which may also contain up to 70 mol % of ethylene, are also of particular interest. The homo- and copolymers of the 1-olefins via metallocene catalysis are also particularly preferred.

Polyolefins having high contents of terminal vinyl or vinylidene double bonds, i.e. those which have more than 50 mol %, preferably more than 70 mol %, of terminal double bonds, are preferred. The dispersity D ($M_w/M_n$) of the polymers used is preferably less than 3. Narrow distributions are preferred. Dispersity is understood as meaning the quotient of the weight average molecular weight $M_w$ divided by the number average molecular weight $M_n$. For example, polyisobutene having distributions of less than 2.0 for $\leq M_n$ 2000 and less than 1.5 for $\leq M_n$ 1000 are particularly advantageous. The polyolefin should be free of organic and inorganic bases, water, alcohols, ethers, acids and peroxides.

Particularly suitable polyisobutenes are in particular highly reactive polyisobutenes which have a high content of terminal ethylenic double bonds. Suitable highly reactive polyisobutenes are, for example, polyisobutenes which contain >70, in particular >80, especially >85, mol % of vinylidene double bonds. Polyisobutenes which have uniform polymer backbones are particularly preferred. Uniform polymer backbones are possessed in particular by those polyisobutenes which are composed of at least 85, preferably at least 90, particularly preferably at least 95, % by weight of isobutene units. Such highly reactive polyisobutenes preferably have a number average molecular weight $M_n$ of from 350 to 20000 Dalton. The highly reactive polyisobutenes can have a polydispersity of <2.5, for example <1.5 at $M_n \leq 1000$.

Particularly suitable highly reactive polyisobutenes are, for example, the Glissopal® grades from BASF Atiengesellschaft, in particular Glissopal 1000 ($M_n$=1000), Glissopal 550 (V 33 ($M_n$=550)) and Glissopal 2300 ($M_n$=2300) and mixtures thereof. Other number average molecular weights can be established in a manner known in principle, by mixing polyisobutenes of different number average molecular weights or by extractive enrichment of polyisobutenes of specific molecular weight ranges.

In novel processes, the polyolefin, in particular polyisobutene can be reacted with maleic acid, maleic anhydride or a functional derivative thereof to give a polyisobutenylsuccinamide. The term functional derivative is understood as meaning those derivatives which lead to the same or a comparable result or product. In the case of maleic acid, functional derivatives include, for example, monoalkyl maleates, dialkyl maleates, maleyl dichloride, maleyl dibromide, maleic acid monoalkyl ester monochloride or maleic acid monoalkyl ester monobromide. The alcohol components used in the case of the maleates are, for example, lower alkyl radicals of, for example, 1 to 6, in particular 1 to 4, carbon atoms, for example methyl or ethyl.

The polyisobutenylsuccinic anhydride formed as an intermediate in the novel process may also be present in the form of a functional derivative, for example in the form of a free acid, of a lower alkyl mono- or diester, or of an acid halide (chloride or bromide). The lower alkyl radical in the ester derivative may comprise, for example, 1 to 6 carbon atoms.

Oligoamines or polyamines are used in the novel process. These may be, for example, alkylenepolyamines, including methylenepolyamines, ethylenepolyamines, butylenepolyamines, propylenepolyamines and pentylenepolyamines. Specific examples of such polyamines include ethylenediamine, triethylenetetramine, propylenediamine, trimethylenediamine, tripropylenetetramine, tetraethylenepentamine, hexaethyleneheptamine, pentaethylenehexamine and mixtures thereof.

Such polyamines are described in detail in the chapter Ethylene Amines in Kirk Othmer's Encyclopedia of Chemical Technology, 2nd Edition, Volume 7, pages 22-37, Interscience Publishers, New York (1965). Such polyamines are particularly expediently prepared by reacting ethylene dichloride with ammonia or by reacting an ethyleneimine with a ring-opening agent, for example water or ammonia.

Particularly preferred oligoamines or polyamines in the novel process are of the structural formula I:

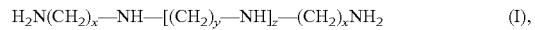

$$H_2N(CH_2)_x-NH-[(CH_2)_y-NH]_z-(CH_2)_xNH_2 \qquad (I),$$

where $x$ and $y$, independently of one another, are each an integer from 1 to 5, preferably from 2 to 4, and $z$ is an integer from 0 to 8, or mixtures thereof.

The alcohols which can be used in the novel process are preferably monohydric alcohols, but polyhydric alcohols are also suitable.

Monohydric or polyhydric alcohols of 1 to 16 carbon atoms are particularly preferred.

Suitable alcohols include methanol, ethanol, n-propanol, isopropanol, cyclopropylcarbinol, n-butanol, sec-butanol, isobutanol, tert-butanol, 2-hydroxymethylfuran, amyl alcohol, isoamyl alcohol, vinylcarbinol, cyclohexanol, n-hexanol, 4-methyl-2-pentanol, 2-ethylbutyl alcohol, sec-capryl alcohol, 2-ethylhexanol, n-decanol, lauryl alcohol, isocetyl alcohol and mixtures thereof. Preferred alcohols are those of 6 to 16 carbon atoms, 2-ethylhexanol being particularly preferred.

The molar ratio of the polyalkenylsuccinic anhydride, in particular polyisobutenylsuccinic anhydride, to alcohol may vary within a wide range. It is not necessary to use stoichiometric amounts of alcohol, and even comparatively small molar amounts of alcohol are sufficient to achieve the advantageous effect of the novel process. An expedient molar PIBSA:alcohol ratio is from 10 to 0.5, preferably from 4 to 0.8.

The phenols include phenol, naphthol, (o,p)-alkylphenols, e.g. di-tert-butylphenol, and salicylic acid.

The novel process for the preparation of novel polyisobutenylsuccinimide products can be controlled in a suitable manner so that a larger amount of either monosuccinimides or bissuccinimides is formed. The novel polyisobutenylsuccinimide products having a higher monosuccinimide content are particularly suitable as additives for fuels (diesel fuel, heating oil, gasoline fuel), while the novel polyisobutenylsuccinimide products having a higher content of bissuccinimides are particularly suitable as additives for lubricants. The ratio of monoimides to bisimides formed can be influenced, for example, by the molar ratio of polyisobutenylsuccinic anhydride to oligoamine or polyamine. The larger the molar amount of polyisobutenylsuccinic anhydride in relation to the oligoamine or polyamine, the larger the resulting amounts of novel monosuccinimide, and vice versa.

In order to obtain a high proportion of monosuccinimide, a molar (PIBSA):oligoamine or polyamine ratio of from 0.7 to 1.3, particularly preferably from 0.9 to 1.1, is employed.

In order to obtain a higher proportion of bissuccinimide, a molar PIBSA:oligoamine or polyamine ratio of from 3 to 18, particularly preferably from 2.3 to 1.9, is preferably employed.

The novel polyisobutenylsuccinimide products can be used as additives (additive packets) for fuels, in particular diesel fuel, heating oil, kerosine or middle distillates generally and gasoline fuel, or lubricants.

If the novel polyisobutenylsuccinimide products are used as diesel fuel additives, they contain an effective amount of polyisobutenylsuccinimide products. The diesel fuel additives expediently contain from 10 to 5000 ppm, preferably from 50 to 1000 ppm, based on the total weight of the diesel fuel, of polyisobutenylsuccinimide products.

The diesel fuel additive mixtures contain at least one further additive selected from detergents, lubricity additives, corrosion inhibitors, cetane number improvers, demulsifiers, antifoams, solvents, solubilizers, antioxidants, metal deactivators, deodorants and other, conventional additives.

The novel polyisobutenylsuccinimide products can also be used as additives for heating oil. They are used in an effective amount, expediently in an amount of from 10 to 1000 ppm, preferably from 50 to 500 ppm, based on the total weight of the heating oil. This may contain at least one further additive which may be selected from corrosion inhibitors, demulsifiers, antifoams antioxidants, metal deactivators, ferrocenes and deodorants.

The novel polyisobutenylsuccinimide products can also be used for gasoline fuel additive mixtures. These contain an effective amount of novel polyisobutenylsuccinimide products, expediently from 10 to 5000 ppm, preferably from 50 to 2000 ppm, based on the total weight of the gasoline fuel.

The gasoline fuel additive mixture containing novel polyisobutenylsuccinimide products may also contain at least one further additive selected from detergent additives, carrier oils, lubricity additives, solvents and corrosion inhibitors.

Finally, the novel polyisobutenylsuccinimide products are also suitable for lubricant compositions, which contain an effective amount of novel products, expediently from 0.1 to 10, preferably from 0.5 to 5, % by weight, based on the total weight of the lubricant composition.

The lubricant composition containing novel polyisobutenylsuccinimide products can also contain further additives which are selected in particular from lubricity additives, antiwear additives, corrosion inhibitors and viscosity index improvers.

The novel polyalkenylsuccinimide products are particularly preferably combined with at least one fuel additive, in particular gasoline fuel additive, having a detergent action or inhibiting valve seat wear action (referred to below as detergent additive). This detergent additive has at least one hydrophobic hydrocarbon-radical having a number average molecular weight ($M_n$) of from 85 to 20000 and at least one polar group selected from:

(a) mono- or polyamino groups of up to 6 nitrogen atoms, at least one nitrogen atom having basic properties;
(b) nitro groups, if required in combination with hydroxyl groups;
(c) hydroxyl groups in combination with mono- or polyamino groups, at least one nitrogen atom having basic properties;
(d) carboxyl groups or their alkali metal or alkaline earth metal salts;
(e) sulfo groups or their alkali metal or alkaline earth metal salts;
(f) polyoxy-$C_2$- to $C_4$-alkylene groups which are terminated by hydroxyl groups or mono- or polyamino groups, at least one nitrogen atom having basic properties, or by carbamate groups;
(g) carboxylic ester groups;
(h) groups derived from succinic anhydride and having hydroxyl and/or amino and/or amido and/or imido groups; and
(i) groups produced by Mannich reaction of substituted phenols with aldehydes and mono- or polyamines.

The hydrophobic hydrocarbon radical in the above detergent additives, which ensures sufficient solubility in the fuel, has a number average molecular weight ($M_n$) of from 85 to 20000, in particular from 113 to 10000, especially from 300 to 5000. Typical hydrophobic hydrocarbon radicals, in particular in combination with polar groups (a), (c), (h) and (i), are the polypropenyl, polybutenyl and polyisobutenyl radicals, each having an $M_n$ of from 300 to 5000, in particular from 500 to 2500, especially from 700 to 2300.

Examples of the above groups of detergent additives are the following:

Additives containing mono- or polyamino groups (a) are preferably polyalkenmono- or polyalkenpolyamines based on polypropene or on highly reactive (i.e. having predominantly terminal double bonds—generally in the alpha- and beta-position) or conventional (i.e. having predominantly middle double bonds) polybutene or polyisobutene having an $M_n$ of from 300 to 5000. Such additives based on highly reactive polyisobutenes, which can be prepared from the polyisobutene, which may contain up to 20% by weight of n-butene units, by hydroformylation and reductive amination with ammonia, monoamines or polyamines, such as dimethylaminopropylamine, ethylenediamine, diethylenetriamine, triethylenetetramine or tetraethylenepentamine, are disclosed in particular in EP-A-244 616. If, in the preparation of the additives, polybutene or polyisobutene having predominantly middle double bonds (generally in the beta- and gamma-position) is used as a starting material, preparation by chlorination and subsequent amination or by oxidation of the double bond with air or ozone to give the carbonyl or carboxyl compound and subsequent amination under reductive (hydrogenating) conditions is possible. The amines used here for the amination may be the same as those used above for the reductive amination of the hydroformylated highly reactive polyisobutene. Corresponding additives based on polypropene are described in particular in WO-A-94/24231.

Further preferred additives containing monoamino groups (a) are the hydrogenation products of the reaction products of polyisobutene having an average degree of polymerization P of from 5 to 100 with oxides of nitrogen or mixtures of oxides of nitrogen and oxygen, as described in particular in WO-A-97/03946.

Further preferred additives containing monoamino groups (a) are the compounds obtainable from polyisobutene epoxides by reaction with amines and subsequent dehydration and reduction of the aminoalcohols, as described in particular in DE-A-196 20 262.

Additives containing nitro groups, if required in combination with hydroxyl groups, (b) are preferably reaction products of polyisobutenes having an average degree of polymerization P of from 5 to 100 or from 10 to 100 with oxides of nitrogen or mixtures of oxide of nitrogen and oxygen, as described in particular in WO-A-96/03367 and WO-A-96/03479. These reaction products are as a rule mixtures of pure nitropolyisobutanes (e.g. 2,4-dinitropolyisobutane) and mixed hydroxynitropolyisobutanes (e.g. 2-nitro-4-hydroxypolyisobutane).

Additives containing hydroxyl groups in combination with mono- or polyamino groups (c) are in particular reaction products of polyisobutene epoxides, obtainable from polyisobutene preferably having predominantly terminal double bonds and having an $M_n$ of from 300 to 5000, with ammonia or mono- or polyamines, as described in particular in EP-A-476 485.

Additives containing carboxyl groups or their alkali metal or alkaline earth metal salts (d) are preferably copolymers of $C_2$-$C_{40}$-olefins with maleic anhydride, having a total molar mass of from 500 to 20000, some or all of the carboxyl groups of which have been converted into the alkali metal or alkaline earth metal salts and the remainder of the carboxyl groups have been reacted with alcohols or amines. Such additives are disclosed in particular in EP-A-307 815. Such additives serve mainly for preventing valve seat wear and, as described in WO-A-87/01126, can advantageously be used in combination with conventional fuel detergents, such as poly(iso)buteneamines or polyetheramines.

Additives containing sulfo groups or their alkali metal or alkaline earth metal salts (e) are preferably alkali metal or alkaline earth metal salts of an alkyl sulfosuccinate, as described in particular in EP-A-639 632. Such additives serve mainly for preventing valve seat wear and can advantageously be used in combination with conventional fuel detergents, such as poly(iso)buteneamines or polyetheramines.

Additives containing polyoxy-$C_2$-$C_4$-alkylene groups (f) are preferably polyethers or polyetheramines, which are obtainable by reacting $C_2$-$C_{60}$-alkanols, $C_6$-$C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group and, in the case of the polyetheramines, by subsequent reductive amination by ammonia, monoamines or polyamines. Such products are described in particular in EP-A-310 875, EP-A-356 725, EP-A-700 985 and U.S. Pat. No. 4,877,416. In the case of polyethers, such products also have carrier oil properties, Typical examples of these are butoxylates of tridecanol and isotridecanol, isononylphenol butoxylates and polyisobutenol butoxylates and propoxylates and the corresponding reaction products with ammonia.

Additives containing carboxylic ester groups (g) are preferably esters of mono-, di- or tricarboxylic acids with long-chain alkanols or polyols, in particular those having a minimum viscosity of 2 $mm^2$/s at 100° C., as described in particular in DE-A-38 38 918. Mono-, di- or tricarboxylic acids which may be used are aliphatic or aromatic acids, and suitable ester alcohols and polyols are in particular long-chain members of, for example, 6 to 24 carbon atoms. Typical members of the esters are adipates, phthalates, isophthalates, terephthalates and trimellitates of isooctanol, of isononanol, of isodecanol and of isotridecanol. Such products also have carrier oil properties.

Additives which contain groups derived from succinic anhydride and having hydroxyl and/or amino and/or amido and/or imido groups (h) are preferably corresponding derivates of polyisobutenylsuccinic anhydride which are obtainable by reacting conventional or highly reactive polyisobutene having an $M_n$ of from 300 to 5000 with maleic anhydride by a thermal route or via the chlorinated polyisobutene. Of particular interest here are the derivatives with aliphatic polyamines, such as ethylenediamine, diethylenetriamine, triethylenetetramine or tetraethylenepentamine. Such gasoline fuel additives are described in particular in U.S. Pat. No. 4,849,572.

Additives containing groups produced by Mannich reaction of substituted phenols with aldehydes and mono- or polyamines (i) are preferably reaction products of polyisobutene-substituted phenols with formaldehyde and mono- or polyamines, such as ethylenediamine, diethylenetriamine, triethylenetetramine, tetraethylenepentamine or dimethylaminopropylamine. The polyisobutenyl-substituted phenol may originate from conventional or highly reactive polyisobutene having an $M_n$ of from 300 to 5000. Such polyisobutene Mannich-bases are described in particular in EP-A-831 141.

With regard to a more exact definition of the individual gasoline fuel additives mentioned, the disclosures of the abovementioned publications of the prior art are hereby expressly incorporated by reference.

The novel fuel additive composition can moreover contain further conventional components and additives. Carrier oils without pronounced detergent effect may primarily be mentioned here.

Suitable mineral carrier oils are fractions obtained in mineral oil processing, such as kerosine or naphtha, brightstock or base oils having viscosities, for example, of grades SN 500-2000, as well as aromatic hydrocarbons, paraffinic hydrocarbons and alkoxyalkanols. A fraction (vacuum distillate cut having a boiling range of about 360 to 500° C., obtainable from natural mineral oil catalytically hydrogenated under high pressure and isomerized and deparaffinized) known as hydrocrack oil and obtained in the refining of mineral oils may also be used. Mixtures of the abovementioned mineral carrier oils are also suitable.

Examples of synthetic carrier oils which may be used according to the invention are selected from: polyolefins (poly-alpha-olefins or poly-internal-olefins), (poly)esters, (poly)alkoxylates, polyethers, aliphatic polyetheramines, alkylphenol-initiated polyethers, alkylphenol-initiated polyetheramines and carboxylic esters of long-chain alkanols.

Examples of suitable polyolefins are olefin polymers having an $M_n$ of from 400 to 1800, especially based on polybutene or polyisobutene (hydrogenated or unhydrogenated).

Examples of suitable polyethers or polyetheramines are preferably compounds which contain polyoxy-$C_2$-$C_4$-alkylene groups and which are obtainable by reaction of $C_2$-$C_{60}$-alkanols, $C_6$-$C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described in particular in EPA-310 875, EP-A-356 725, EP-A-700 985 and U.S. Pat. No. 4,877,416. For example, poly-$C_2$-$C_6$-alkylene oxide amines or functional derivatives thereof may be used as polyetheramines. Typical examples of these are butoxylates of tridecanol and of isotridecanol, isononylphenol butoxylates and polyisobutenol butoxylates and propoxylates and the corresponding reaction products of ammonia.

Examples of carboxylic esters of long-chain alkanols are in particular esters of mono-, di- or tricarboxylic acids with long-chain alkanols or polyols, as described in particular in DE-A-38 38 918. The mono-, di- or tricarboxylic acids used may be aliphatic or aromatic acids, and suitable ester alcohols and ester polyols are in particular long-chain members having, for example, 6 to 24 carbon atoms. Typical esters are adipates, phthalates, isophthalates, terephthalates and trimellitates of isooctanol, of isononanol, of isodecanol and of isotridecanol, e.g. di(n-tridecyl or isotridecyl) phthalate.

Further suitable carrier oil systems are described, for example, in DE-A-38 26 608, DE-A-41 42 241, DE-A-43 09 074, EP-A-0 452 328 and EP-A-0 548 617, which are hereby expressly incorporated by reference.

Examples of particularly suitable synthetic carrier oils are alcohol-initiated polyethers having from about 5 to 35, e.g. from about 5 to 30, $C_3$-$C_6$-alkylene oxide units, for example selected from propylene oxide, n-butylene oxide and isobutylene oxide units, or mixtures thereof. Nonlimiting examples of suitable initiator alcohols are long-chain alkanols or phenols substituted by long-chain alkyl, the long-chain alkyl radical being in particular a straight-chain or branched $C_6$-$C_{18}$-alkyl radical, preferably a $C_8$-$C_{15}$-alkyl radical. Preferred examples are tridecanol and nonylphenol.

Further suitable synthetic carrier oils are alkoxylated alkylphenols, as described in DE-A-101 02 913.6.

Further conventional additives are corrosion inhibitors, for example based on those ammonium salts of organic carboxylic acids which tend to form films or on heterocyclic aromatics in the corrosion protection of nonferrous metals; antioxidants or stabilizers, for example based on amines, such as p-phenylenediamine, dicyclohexylamine or derivatives thereof or on phenols, such as 2,4-di-tert-butylphenol or 3,5-di-tert-butyl-4-hydroxyphenylpropionic acid; demulsifiers; antistatic agents; metallocenes, such as ferrocene; methylcyclopentadienlylmanganesetricarbonyl; lubricity additives, such as specific fatty acids, alkenylsuccinic esters, bis(hydroxyalkyl) fatty amines, hydroxyacetamides or castor oil; and markers. If required, amines may also be added for reducing the pH of the fuel.

The components or additives can be added to the fuel, e.g. gasoline fuel, individually or as a previously prepared concentrate (additive packet), together with the novel polyalkenylsuccinimide.

Said detergent additives having the polar groups (a) to (i) are added to the gasoline fuel usually in an amount of from 10 to 5000, in particular from 50 to 1000, ppm by weight. The other components and additives mentioned are added, if desired, in amounts customary for this purpose.

The novel additive compositions can be used in all conventional gasoline fuels, as described, for example, in Ullmann's Encyclopedia of Industrial Chemistry, 5th Edition, 1990, Volume A16, page 719 et seq.

For example, the use in a gasoline fuel having an aromatics content of not more than 42% by volume and a sulfur content of not more than 150 ppm by weight is possible.

The aromatics content of the gasoline fuel is, for example, from 30 to 42, in particular from 32 to 40, % by volume.

The sulfur content of the gasoline fuel is, for example, from 5 to 150, in particular from 10 to 100, ppm by weight.

The gasoline fuel has, for example, an olefin content of from 6 to 21, in particular from 7 to 18, % by volume.

The gasoline fuel may have, for example, a benzene content of from 0.5 to 1.0, in particular from 0.6 to 0.9, % by volume.

The gasoline fuel has, for example, an oxygen content of from 1.0 to 2.7, in particular from 1.2 to 2.0, % by weight.

Gasoline fuels which may be particularly mentioned by way of example are those which simultaneously have an aromatics content of not more than 38% by volume, an olefin content of not more than 21% by volume, a sulfur content of not more than 50 ppm by weight, a benzene content of not more than 1.0% by volume and an oxygen content of from 1.0 to 2.7% by weight.

The content of alcohols and ethers in the gasoline fuel is usually relatively low. Typical maximum contents are 3% by volume for methanol, 5% by volume for ethanol, 10% by volume for isopropanol, 7% by volume of tert-butanol, 10% by volume of isobutanol and 15% by volume for ethers having 5 or more carbon atoms in the molecule.

The summer vapor pressure of the gasoline fuel is usually not more than 70, in particular 60, kPa (in each case at 37° C.). The RON of the gasoline fuel is as a rule from 90 to 100. A usual range for the corresponding MON is from 80 to 90.

Said specifications are determined by conventional methods (DIN EN 228).

The examples which follow illustrate the invention.

EXAMPLES 1 AND 2

Prevention of the Frothing of the Mixture of Starting Materials

For determining the required reaction volume or the volume increase during the reaction, a graduated 500 ml reaction flask with a stirrer and a likewise graduated riser tube (capacity 200 ml) was filled with 300 g of polyisobutenylsuccinic anhydride (PIBSA) (saponification value SV 95) and 50 g of tetraethylenepentamine. After thorough mixing of the starting materials, the total volume $V_0$ was determined as 375 ml, or a level of 75%, at a temperature of 50° C. The content of the flask as then heated to 140° C. within 20 minutes. The degree of filling of the volume of starting materials was determined at intervals of 3 minutes (without a stirrer or with the stirrer switched off). The additives used in each case (alcohol or solvent) are listed in the table below. In each case the maximum volume increase observed was used for the evaluation.

TABLE II

|  | ROH [ml] | Solvent* [ml] | $V_0$ [ml] | $V_{max.}$ [ml] | ΔV [%] |
|---|---|---|---|---|---|
| Comparison | — | — | 375 | 640 | 71 |
| Example 2 | Ethylhexanol 40 | — | 415 | 460 | 10.8 |

TABLE II-continued

| | ROH [ml] | Solvent* [ml] | $V_0$ [ml] | $V_{max.}$ [ml] | $\Delta V$ [%] |
|---|---|---|---|---|---|
| Example 3 | n-Butanol 25 | — | 400 | 450 | 12.5 |
| Comparison | — | 40 | 415 | 675 | 63 |

*Solvesso ® 150

Thus, the batch yield can be increased by about 40% by the novel addition of alcohol in the case of a given reaction container. The volume increase still occurring in the presence of the alcohol can be substantially ascribed to the thermal expansion of the reaction mixture on heating to 140° C.

EXAMPLES 3 TO 7

Preparation of Monosuccinimides as Additives for Fuels

General Procedure:

In a 1 l three-necked flask, 630 g of polyisobutenylsuccinic anhydride (PIBSA) 1000 having a number average molecular weight $M_n$ of 1000 and a saponification value of 95 are mixed with from 0.2 to 2 mol of an alcohol (ROH) and heated to 80 to 160° C. in the course of 20-minutes. 0.55 mol of an amine (for example 105 g of tetraethylenepentamine (TEPA) or 82 g of triethylenetetramine (TETA)) is added. At from 150 to 180° C., stirring is then continued for from 90 to 180 minutes. If desired, the alcohol can then be removed under reduced pressure.

For determining the saponification value, 1.0 g of product is refluxed in 25 ml of a 0.5 normal KOH with 1:1 ethanol/toluene as solvent for 10 minutes, the hotplate is removed, the reflux condenser is washed with 20 ml of methanol and, after cooling, back-titration is effected with aqueous HCl.

TABLE 1

| Example | Alcohol | Molar PIBSA/ROH ratio | Amine | Molar PIBSA/amine ratio |
|---|---|---|---|---|
| 3 | Ethanol | 1.0 | TEPA[1] | 1.0 |
| 4 | n-Butanol | 0.5 | TEPA | 1.0 |
| 5 | 2-Ethylhexanol | 1.0 | TEPA | 1.0 |
| 6 | Isopropanol | 1.0 | TETA[2] | 1.0 |
| 7 | 2-Ethylhexanol | 0.5 | TETA | 1.0 |

[1]TEPA: Tetraethylenepentamine
[2]TETA: Triethylenetetramine

EXAMPLES 8 TO 11

Preparation of Bissuccinimides as Additives for Lubricating Oils

General Procedure:

In a 1 l three-necked flask, 680 g of polyisobutenylsuccinic anhydride 1000 having a number average molecular weight $M_n$ of 1000 Dalton and a saponification value of 95 are mixed with from 0.2 to 2 mol of an alcohol (ROH) and heated to 80 to 160° C. in the course of 20 minutes. 0.3 mol of tetraethylenepentamine (TEPA) or triethylenetetramine (TETA) is added. At from 150 to 180° C., stirring is continued for from 90 to 160 minutes. The product is then freed from the alcohol under reduced pressure.

The details are shown in table 2 below.

TABLE 2

| Example | Alcohol | Molar PIBSA/ROH ratio | Amine | Molar PIBSA/amine ratio |
|---|---|---|---|---|
| 8 | 2-Ethylhexanol | 1.5 | TEPA[1] | 2.0 |
| 9 | n-Butanol | 1.0 | TETA[2] | 2.0 |
| 10 | 2-Ethylhexanol | 1.0 | TETA | 2.0 |
| 11 | 2-Ethylhexanol | 1.0 | TETA | 2.0 |

[1]TEPA: Tetraethylenepentamine
[2]TETA: Triethylenetetramine

Results of the Engine Tests

Engine tests were carried out on a stationary Peugeot diesel engine type XUD 9, 45 kW, 1.9 l stroke×bore). A low-sulfur diesel fuel according to EN 590, having a detergent content of 300 ppm, was used.

For the comparative example, 300 ppm of a commercial monosuccinimide dispersant were added to a commercial fuel corresponding to DK EN 590. The monosuccinimide dispersant was prepared by a process which was carried out without the novel alcohol addition. PIBSA 1000 and TEPA were used. This preparation process is described in WO 98/12282 and EP-A-271937, respectively.

A 6 hour cycle with variable speed and declining power output was chosen as the test procedure for determining engine deposits. The test was carried out analogously to the methods described in the draft for European standard CEC-PF 023. The cleanliness of the combustion chamber was then quantitatively determined. Deposits on the injection nozzle were determined from the reduction in the flow rate in % according to ISO 4113.

TABLE 3

| | Ex. 3 | Ex. 4 | Ex. 5 | Ex. 6 | Ex. 7 | Comparative example |
|---|---|---|---|---|---|---|
| Deposits in combustion chamber [mg/cylinder] | 525 | 370 | 380 | 530 | 405 | 560 |
| Reduced flow rate in injection nozzles [%] | 53 | 46 | 42 | 49 | 45 | 61 |

Results for performance of lubricating oil additives

The spot test is described, inter alia, in Les Huiles pour Moteurs et le Graissage des Moteurs, Volume 1, 1962, pages 89-90, by A. Schilling.

TABLE 4

| | Ex. 8 | Ex. 9 | Ex. 10 | Ex. 11 | Ex. 12 | Comparative example* |
|---|---|---|---|---|---|---|
| Results of the Tupfel test | 615 | 638 | 653 | 605 | 623 | 580 |

*Prepared without addition of alcohol by a process substantially described in DE-A-2808105 and US-A-5,137,978.

We claim:
1. A process for the preparation of a polyisobutenylsuccinimide product, comprising reacting a polyisobutene with maleic acid, maleic anhydride or a functional derivative thereof to give a polyisobutenylsuccinic anhydride and then reacting the polyisobutenylsuccinic anhydride with an oligoamine or polyamine, wherein the polyisobutenylsuccinic anhydride is either
  (a) first reacted with a $C_1$-$C_{16}$-alcohol or phenol and, without isolation of the reaction product, then with the oligoamine or polyamine, and unreacted or cleaved alcohol, or unreacted or cleaved phenol, is then optionally removed, or
  (b) reacted with the oligoamine or polyamine in the presence of the alcohol or phenol as a reactant, and unreacted or cleaved alcohol, or unreacted or cleaved phenol, is then optionally removed,
  wherein the alcohol is selected from the group consisting of monohydric alcohols of the formula ROH, where R is straight-chain or branched, cyclic or branched cyclic alkyl of 1 to 16 carbon atoms.

2. A process as claimed in claim 1, wherein the reaction with the alcohol or phenol is carried out at elevated temperatures.

3. A process as claimed in claim 1, wherein the alcohol is used.

4. A process as claimed in claim 1, wherein the oligoamines or polyamines used are those of the formula I:

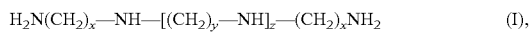

$$H_2N(CH_2)_x\text{—}NH\text{—}[(CH_2)_y\text{—}NH]_z\text{—}(CH_2)_xNH_2 \qquad (I),$$

where x and y, independently of one another, are each an integer from 1 to 5 and z is an integer from 0 to 8, or mixtures thereof.

5. A polyisobutenylsuccinimide product obtainable by a process comprising reacting a polyisobutene with maleic acid, maleic anhydride or a functional derivative thereof to give a polyisobutenylsuccinic anhydride and then reacting the polyisobutenylsuccinic anhydride with an oligoamine or polyamine, the polyisobutenylsuccinic anhydride either
  (a) first reacted with a $C_1$-$C_{16}$-alcohol or phenol and, without isolation of the reaction product, then with the oligoamine or polyamine, and unreacted or cleaved alcohol, or unreacted or cleaved phenol, is then optionally removed, or
  (b) being reacted with the oligoamine or polyamine in the presence of the alcohol or phenol as a reactant, and unreacted or cleaved alcohol, or unreacted or cleaved phenol, is then optionally removed,
  wherein the alcohol is selected from the group consisting of monohydric alcohols of the formula ROH, where R is straight-chain or branched, cyclic or branched cyclic alkyl of 1 to 16 carbon atoms.

6. A polyisobutenylsuccinic monoester intermediate obtained by reaction of components comprising
  (a) polyisobutene having a number average molecular weight Mn of from 500 to 10000 Dalton and a content of terminal double bonds of more than 50 mol %,
  (b) maleic anhydride and
  (c) an alcohol of the formula ROH, where R is straight-chain or branched, cyclic or branched cyclic alkyl of 1 to 16 carbon atoms, or phenols.

7. A polyisobutenylsuccinic monoester intermediate as claimed in claim 6, wherein (c) is 2-ethylhexanol.

8. A process for the preparation of a polyisobutenylsuccinic monoester intermediate as claimed in claim 6 comprising reacting polyisobutene with maleic acid, maleic anhydride or a functional derivative thereof, wherein the polyisobutenylsuccinic anhydride formed is reacted with the alcohol.

9. A diesel fuel additive mixture, comprising an effective amount of a polyisobutenylsuccinimide product as claimed in claim 5 and, optionally, at least one further additive.

10. A diesel fuel additive mixture as claimed in claim 9, comprising at least one further additive selected from detergents, lubricity additives, corrosion inhibitors, cetane number improvers, demulsifiers, antifoams, solvents, solubilizers, antioxidants, metal deactivators and deodorants.

11. A gasoline fuel additive mixture, comprising an effective amount of a polyisobutenylsuccinimide product, as claimed in claim 5, and, optionally, at least one further additive.

12. A gasoline fuel additive mixture as claimed in claim 11, comprising at least one further additive selected from detergent additives, carrier oils, lubricity additives, solvents and corrosion inhibitors.

13. A lubricant composition, comprising an effective amount of a polyisobutenylsuccinimide product as claimed in claim 5, and, optionally, at least one further additive.

14. A lubricant composition as claimed in claim 13, comprising at least one further additive selected from lubricity additives, antiwear additives, corrosion inhibitors and viscosity index improvers/additives.

15. A process for the preparation of a polyisobutenylsuccinic monoester intermediate as claimed in claim 7 comprising reacting polyisobutene with maleic acid, maleic anhydride or a functional derivative thereof, wherein the polyisobutenylsuccinic anhydride formed is reacted with 2-ethylhexanol.

16. A process as claimed in claim 2, wherein the reaction is carried out at from 50 to 180° C.

17. A process as claimed in claim 2, wherein the reaction is carried out at from 80 to 160° C.

18. A polyisobutenylsuccinic monoester intermediate as claimed in claim 6, wherein the polyisobutene has a content of terminal double bonds of more than 75 mol %.

19. A polyisobutenylsuccinic monoester intermediate as claimed in claim 7, wherein the polyisobutene has a content of terminal double bonds of more than 75 mol %.

20. A process as claimed in claim 1, wherein (a) is carried out.

21. A process as claimed in claim 1, wherein (b) is carried out.

22. A polyisobutenylsuccinimide product as claimed in claim 5, wherein (a) is carried out.

23. A polyisobutenylsuccinimide product as claimed in claim 5, wherein (b) is carried out.

24. A diesel fuel comprising the diesel fuel additive mixture as claimed in claim 9.

25. A gasoline fuel comprising the gasoline fuel additive mixture as claimed in claim 11.

* * * * *